US012018703B2

(12) United States Patent
Kusiak et al.

(10) Patent No.: US 12,018,703 B2
(45) Date of Patent: Jun. 25, 2024

(54) HYDRAULIC CHARGING SYSTEM WITH ELECTRONIC POWER LIMITING AND LOAD BALANCING

(71) Applicants: Kevin Kusiak, Fort Lauderdale, FL (US); Victor Acosta, Fort Lauderdale, FL (US); John Barth, Fort Lauderdale, FL (US); John Allen, Fort Lauderdale, FL (US)

(72) Inventors: Kevin Kusiak, Fort Lauderdale, FL (US); Victor Acosta, Fort Lauderdale, FL (US); John Barth, Fort Lauderdale, FL (US); John Allen, Fort Lauderdale, FL (US)

(73) Assignee: QUANTUM MARINE ENGINEERING, INC., Ft. Lauderdale, FL (US)

( * ) Notice: Subject to any disclaimer, the term of this patent is extended or adjusted under 35 U.S.C. 154(b) by 646 days.

(21) Appl. No.: 16/925,487

(22) Filed: Jul. 10, 2020

(65) Prior Publication Data

US 2022/0010816 A1 Jan. 13, 2022

(51) Int. Cl.
*F15B 1/033* (2006.01)
*F15B 1/02* (2006.01)

(52) U.S. Cl.
CPC .............. *F15B 1/033* (2013.01); *F15B 1/024* (2013.01); *F15B 2211/20515* (2013.01); *F15B 2211/20546* (2013.01); *F15B 2211/20576* (2013.01); *F15B 2211/212* (2013.01); *F15B 2211/5151* (2013.01)

(58) Field of Classification Search
CPC .......... F04B 49/08; F04B 35/04; F15B 1/024; F15B 1/033
See application file for complete search history.

(56) References Cited

U.S. PATENT DOCUMENTS

| | | | | |
|---|---|---|---|---|
| 2012/0169358 A1* | 7/2012 | Ono | ..................... | G01R 31/389<br>324/720 |
| 2018/0086345 A1* | 3/2018 | Nakamura | ............ | E02F 9/2217 |

* cited by examiner

*Primary Examiner* — Abiy Teka
(74) *Attorney, Agent, or Firm* — Andrew S. Rapacke; The Rapacke Law Group, P.A.

(57) ABSTRACT

A marine hydraulic system and method of use for reducing cyclic loading of the pump(s) and motor(s) and an amount of accumulator storage required in a hydraulic system. A closed loop logic controller comprising at least one control algorithm for each pump/motor pair utilized in a single hydraulic system is utilized to reduce load fluctuations on the motors, allow the use of common pressure compensated, variable displacement (VDH) pumps, reduce the number and/or volume of system accumulators and equalize wear throughout the system.

28 Claims, 5 Drawing Sheets

HYDRAULIC CHARGING SYSTEM WITH ELECTRONIC POWER LIMITING AND LOAD BALANCING

BACKGROUND OF THE INVENTION

This application relates to hydraulic systems and more particularly to hydraulic systems typically requiring large amounts of accumulation to maintain constant pressure. The application more specifically relates to hydraulic systems that require accumulation to maintain a system pressure on a pressure compensated, variable displacement pump, which experience heavy cyclic loading. The application also relates to a method for reducing power fluctuations seen on electrical systems. The hydraulic systems and methods described herein have particularly high application and value to marine hydraulic systems.

SUMMARY OF THE INVENTION

The hydraulic charging system described herein was originally conceived to address unresolved issues found in the marine industry due to the closed electrical system running on a generator where sudden load spikes pull down the supply voltage and can be seen throughout the vessel. Fortunately, this system can be expanded and adapted to any hydraulic system that requires accumulation to maintain a system pressure on a pressure compensated, variable displacement pump which experiences heavy cyclic loading.

Among the many benefits to its users, the system greatly reduces the power fluctuations seen on the electric system. The system also provides electronic power limiting, allowing the use of more common pressure compensated, variable displacement pumps. The system allows for a reduction in the total volume of hydraulic fluid accumulation. Finally, the system provides load balancing between pumps and motors when using multiple pumps on single hydraulic systems, to equalize wear throughout a system.

BRIEF DESCRIPTION OF THE INVENTION

This hydraulic control system uses one system pressure sensor as a system pressure feedback and is the component being varied. Each pump/motor combination in the system has one current transducer for load monitoring on the motor and one electronic control pressure relief valve, to vary the system target pressure. Those signals go back to the controller, which oversees the task of maintaining constant loads, while limiting the power that each pump draws from a motor and balances the load between multiple motors. To accommodate systems that require constant pressure, the use of a pressure reducing valve after the power pack can be used, which helps with controllability of items such as servo valves or flow control valves.

The main power supply can be any device capable of starting the electric motor, such as a generator. A current sensor monitors the load draw/current draw or load of the motor during operation and is used as one of the parameters of feedback control. The electric motor drives a pressure compensated, variable displacement hydraulic (VDH) pump which builds pressure through the system by pumping hydraulic fluid until it reaches the setpoint of the pressure control valve and charging a hydraulic accumulator. While the system is being charged the pressure is monitored electronically by the pressure sensor which is used as a feedback control. The two feedback controls (pressure and current load) are fed into the logic controller, which can be any device that provides a closed loop control such as, but not limited to a Programmable Logic Controller (PLC), micro-controllers, and so on, as described in further detail below. The two signals are processed and the command to the pressure control valves is varied to reach the desired loading conditions. A pressure reducing valve is an optional component which holds system pressure constant to help with control valves, such as servo valves or flow control valves, downstream.

Among the unique features of the system is the idea that the load downstream from the power pack slowly changes over time, even though it may instantaneously fluctuate within the power pack from low load to high load. In order to maintain the constant load as measured by the current sensor, the pressure control valve setting is increased while the system load demand is reduced or decreasing, which causes the pressure to rise in the accumulator, increasing the amount of stored oil. Inversely, when the system load increases downstream, the extra oil stored in the accumulator is then released into the system. At that point, the command to the pressure control valve is reduced to maintain a more constant load. To do this, one control loop within the logic controller, (the pressure control loop), looks at the target pressure verses the current pressure, and is directed to maintain an average pressure value. That value is then fed into the next control loop.

Since the hydraulic pump imposes load on the electric motor, based on the flow and pressure output, one can increase or decrease the load by adjusting the pressure of the control valve. As long as the minimum pressure at the pressure sensor remains higher than the system pressure required downstream at any control valves, the system will function identically, due to the pressure reducing valve. Some embodiments may not require the pressure reducing valve since they perform the same function as the pressure reducing valve, such as but not limited to, electronic pressure reducing/relieving valve.

Further, since the load draw from the motor is monitored with the current sensor, one can also limit the power output of the pump, by lowering the pressure, if the load on the electric motor starts approaching the limit.

Finally, one of skill in the art will recognize upon reading this disclosure, that the system can also be used in a multiple motor/pump configuration connected to one logic control, as illustrated below. While using this configuration, an additional control algorithm is used in the logic controller to balance out the loading of all the motors, which uses corresponding additional current sensor readings for each motor/pump configuration as feedback and makes small adjustments to the control valves. In some embodiments, the current sensor reading may come from a power source start device. This gives an additional advantage of maintaining similar wear throughout the system.

Provided herein is a hydraulic charging system comprising: at least one power source; at least one electric motor; at least one current sensor; at least one variable displacement hydraulic (VDH) pump; at least one electronic pressure control valve; at least one hydraulic fluid accumulator; an electronic pressure sensor; and a closed loop logic controller comprising multiple control algorithms; wherein the at least one power source provides power to the at least one electric motor, the at least one electric motor drives the at least one (VDH) pump, the at least one current sensor electronically monitors the load draw of the at least one motor during operation, and the at least one VDH Pump pressurizes a hydraulic fluid until it reaches a varying setpoint of the at least one pressure control valve, and charges the at least one accumulator to a pressure that is equal to or higher than the system pressure requirements, wherein the system hydraulic fluid pressure is electronically monitored by the pressure sensor, wherein the at least one current sensor and the pressure sensor provide feedback readings to the closed loop logic controller, and wherein the closed loop logic controller processes load readings from the at least one current sensor and pressure readings from the pressure sensor using the multiple control algorithms, (which in a preferred embodiment may be three or more), to generate commands to the at least one electronic pressure control valve to maintain a constant desired load condition of the at least one variable displacement hydraulic (VDH) pump, and therefore the load of the at least one electric motor.

In some embodiments, the hydraulic charging system further comprising a downstream pressure reducing valve downstream from the pressure control valve to hold a downstream system pressure fixed irrespective of the pressure measured at the pressure control valves.

In some embodiments, the hydraulic charging system is adapted to hydraulic systems powered by generator power sources.

In some embodiments, the hydraulic charging system is specifically adapted to marine hydraulic systems such as those deployed for large sailing and seafaring vessels.

In some embodiments, the hydraulic charging system is adapted to other high-power hydraulic systems powered by generator power sources, such as those deployed for construction equipment power systems, emergency power back-up power systems or aviation systems, to name but a few.

In some embodiments, the hydraulic charging system is adaptable to any system that requires a constant load draw from an available power source, wherein the hydraulic system fluctuates causing the power source to act in a negative behavior, such as, but not limited to voltage drops, frequency drops, or current spikes.

In some embodiments of the hydraulic charging system, the at least one electric motor is turned on by a power source start device such as variable frequency drive (VFD), a one speed drive (OSD); or a Delta-Wye starter.

In some embodiments of the hydraulic charging system, the at least one electronic pressure control valve comprises: a pressure relief valve, a pressure reducing/relieving valve, or a flow control valve.

In some embodiments of the hydraulic charging system, the average load condition measured by the at least one current sensor slowly changes over time when measured at known intervals.

In some embodiments of the hydraulic charging system, the instantaneous load condition measured by the at least one current sensor is maintained constant by the power control loop of the control algorithm.

In some embodiments of the hydraulic charging system, the load condition is maintained by increasing a pressure setting controlled by the control algorithm of the pressure control loop for the electronic pressure control valve when the system demand is reduced or decreasing.

In some embodiments of the hydraulic charging system, the at least one VDH pump imposes loads on the at least one electric motor such that based on the flow and pressure output, one can increase or decrease the load by adjusting the pressure of the control valve which is controlled by the pressure control loop of the control algorithm.

In some embodiments of the hydraulic charging system, the load condition is maintained by decreasing the pressure setting of the electronic pressure control valve when the system demand is increased or raised using the pressure control loop of the control algorithm.

In some embodiments of the hydraulic charging system, downstream increases in the system flow cause hydraulic fluid to be released from the accumulator into the system.

In some embodiments of the hydraulic charging system, the average pressure changes cause a first control loop in the logic controller to compare target pressures versus current pressure and is directed to maintain an average pressure value using the pressure control loop of the control algorithm.

In some embodiments of the hydraulic charging system, the load control loop of the control algorithm issues a command to the at least one electronic pressure control valve to reduce pressure in order to maintain a constant average percent load as measured at the at least one current sensor.

In some embodiments of the hydraulic charging system, the system will continue to function normally as long as the minimum pressure sensed by the electronic pressure sensor remains greater than the desired system pressure downstream. In any given embodiment of the hydraulic charging system, the load conditions being sensed by the electronic pressure sensor vary depending on the application of the hydraulic system. Stated differently, the known parameters for a desired downstream system pressure will vary, depending on the application requirements. For example, some hydraulic systems may require a nominal desired 1,000 psi pressure. So, this system will function identically, as long as the pressure in the hydraulic charging system is above 1000 psi, regardless of the actual pressure and fluctuation rate.

In some embodiments of the hydraulic charging system, the output load of the pump is capable of being limited by up to 100% by lowering the system pressure. In some embodiments, power (or torque) limiting of the pump is controlled in order to prevent the motors from drawing more current than the motors are rated for. In some embodiments the power of the motors is controlled by an algorithm in one of the sequential control loops of the closed loop logic controller or mechanically on the pump with hydraulic logic control.

Provided herein is a closed loop logic controller for controlling a hydraulic charging system having multiple control algorithms comprising; a pressure control loop, a power limiting control loop and a high speed load control loop; wherein the pressure control loop receives an average pressure reading from an electronic pressure sensor located after an upstream pressure compensated variable displacement hydraulic (VDH) pump and at least one accumulator and compares said pressure reading to a pressure setpoint to generate a first control point or setpoint, wherein the power limiting control loop receives a load reading from an electronic current sensor located between a power source and an electric motor driving said (VDH) pump and compares said load reading to a load limiting setpoint and generates a second control point or a maximum output value, wherein said pressure control loop forwards the first control point or setpoint and said power limiting control loop forwards the second control point or maximum output value to a high speed load control loop; and wherein the high speed load control loop controls the first control point in a high speed manor by reading the signal "live" from the pressure sensor approximately every 20 milliseconds, or faster and utilizes the second control point as a limiting value to regulate pressure of a hydraulic fluid from the at least one hydraulic accumulator, to control the load of the system by sending an output signal to a pressure control valve to increase or decrease flow appropriately. The second control point acts as a maximum limit or maximum output value from the current sensor for the power load before triggering the pump to reduce pressure.

In some embodiments of the hydraulic charging system, the load condition is maintained by increasing a pressure setting controlled by the load control loop of the control algorithm for the electronic pressure control valve when the system demand is reduced or decreasing.

In some embodiments of the hydraulic charging system, the load condition is maintained by decreasing the pressure setting of the electronic pressure control valve when the system demand is increased or raised using the load control loop of the control algorithm.

Provided herein is a method of controlling a hydraulic charging system comprising: providing a closed loop logic controller comprising multiple control algorithms; wherein a pressure control loop: receives an average pressure reading from an electronic pressure sensor located after an upstream pressure compensated variable displacement hydraulic (VDH) pump and at least one hydraulic accumulator, compares said pressure reading to a pressure setpoint to generate a first control point; wherein a power limiting control loop: receives a load reading from an electronic current sensor located between a power source and an electric motor driving said VDH pump, compares said load reading to a load limiting setpoint and generates a second control point; wherein said pressure control loop forwards the first control point and said power limiting control loop forwards the second control point to a high speed load control loop and wherein said high speed load control loop controls the first control point in a high speed manner by reading the signal "live" from the pressure sensor approximately every 20 milliseconds, or faster and utilizes the second control point as a limiting value to regulate pressure of a hydraulic fluid from the at least one hydraulic accumulator to control the load of the system by sending an output signal to a pressure control valve to increase or decrease flow appropriately. The second control point acts as a maximum limit or maximum output value from the current sensor for the power load before triggering the pump to reduce pressure.

Provided herein is a hydraulic charging system comprising: two or more power sources; two or more electric motors; two or more current sensors; two or more variable displacement hydraulic (VDH) pumps; two or more electronic pressure control valves; at least one hydraulic fluid accumulator; an electronic pressure sensor; and a closed loop logic controller comprising multiple, (which in a preferred embodiment may be four or more), control algorithms to balance the loading of the two or more electric motors; wherein the two or more power sources provide power to the two or more electric motors, the two or more electric motors drive the two or more (VDH) pumps, the two or more current sensors electronically monitor the load draw of the two or more motors during operation, and the two or more VDH pumps pressurize a hydraulic fluid until it reaches a setpoint of each of the two or more pressure control valves, and charges the at least one accumulator to a pressure that is equal to or higher than the system pressure requirements; wherein the system hydraulic fluid pressure is electronically monitored by the pressure sensor; wherein the two or more current sensors and the pressure sensor provide feedback readings to the closed loop logic controller, and wherein the multiple control algorithms of the closed loop logic controller processes the two or more current sensor readings and the pressure sensor reading to generate commands to the two or more electronic pressure control valves to maintain desired constant loading conditions of the two or more variable displacement hydraulic (VDH) pumps and therefore the desired constant loading conditions the two or more electric motors.

In some embodiments, at least one current sensor reading may come from the Power Source Start Device.

In some embodiments of the hydraulic charging system, the system further comprises a downstream pressure reducing valve to hold a downstream system pressure fixed irrespective of the pressure measured at the pressure control valves.

In some embodiments, the hydraulic charging system is adapted to hydraulic systems powered by generator power sources.

In some embodiments, the hydraulic charging system is adapted to marine hydraulic systems.

In some embodiments, the hydraulic charging system is adapted to construction equipment power systems; emergency power back-up systems or aviation systems.

In some embodiments, the hydraulic charging system is adaptable to any system that requires a constant load draw from the available power source wherein the hydraulic system fluctuates causing the power source to act in a negative behavior, such as, but not limited to voltage drops, frequency drops, or current spikes.

Provided herein is a closed loop logic controller for controlling a hydraulic charging system having multiple control algorithms comprising; a pressure control loop, a load balancing control loop, a current sensor selector, a power limiting control loop; and a high speed load control loop; wherein the pressure control loop receives an average pressure reading from an electronic pressure sensor located after a plurality of upstream pressure compensated variable displacement hydraulic (VDH) pumps and at least one accumulator and compares said pressure reading to a pressure setpoint to generate a first control point or setpoint, wherein a load balancing control loop and a current sensor selector each receive a load signal from two or more current sensors, wherein the current sensor selector selects the highest current in the system and sends that signal to the power limiting control loop and the load control loop, wherein the power limiting control loop; receives the highest load signal from the current sensor selector of the at least two current sensors to create a second control point or setpoint, said power limiting control loop forwards the second control point to the high speed load control loop and wherein said high speed load control loop controls the first control point in a high speed manner by reading the live signal from the pressure sensor approximately every 20 milliseconds, or faster and utilizes the second control point or setpoint as a limiting value and the limit of the output for the high speed load control loop, wherein the high speed load control loop maintains the system load, reduces the power fluctuations on the electrical system, and is limited by the power limiting control loop, wherein the load control loop transmits a signal to one of the pressure control valves and a load balancing incorporation module (to calculating a balanced load output) , wherein the load balancing incorporation module receives the output of the load balancing control loop signal value and the load control loop signal value to cause the load of the two or more motors to run at the same load and sends corresponding balanced signal to the plurality of pressure control valves.

In some embodiments of the hydraulic charging system, the load condition is maintained by increasing a pressure setting controlled by the load control loop of the control algorithm for the electronic pressure control valve when the system demand is reduced or decreasing.

In some embodiments of the hydraulic charging system, the load condition is maintained by decreasing the pressure setting of the electronic pressure control valve when the system demand is increased or raised using the load control loop of the control algorithm.

Provided herein is a method of reducing cyclic loading in a hydraulic system comprising: providing at least one electric motor; providing at least one current sensor providing at least one pressure compensated, variable displacement (VDH) pump; providing at least one electronic pressure control valve; providing at least one hydraulic fluid accumulator; and providing an electronic pressure sensor providing a closed loop logic controller comprising a multiple control algorithms; wherein the at least one power source provides power to the at least one electric motor to drive the at least one (VDH) pump, which charges the accumulator to a pressure that is equal to or higher than the system pressure requirements and pressurizes a hydraulic fluid until it reaches a setpoint of the at least one electronic pressure control valve, wherein the at least one current sensor electronically monitors the load draw of the at least one motor during operation and the system hydraulic fluid pressure is electronically monitored by the pressure sensor; wherein the at least one current sensor and the pressure sensor provide feedback readings to the closed loop logic controller, and the multiple algorithms of the closed loop logic controller processes the at least one current sensor reading and the pressure sensor reading using the multiple control algorithms (could be 2, 3 or more) to generate commands to the at least one electronic pressure control valve to reduce cyclic load spikes in the loading conditions of the at least one variable displacement hydraulic (VDH) pump and therefore, the at least one electric motor.

In some embodiments of the method, a downstream pressure reducing valve is provided to hold a downstream system pressure fixed irrespective of the pressure measured at the at least one pressure control valve.

In some embodiments of the method, the size or volume of the hydraulic accumulator can be reduced within a range of between about 60% to about 80% without affecting performance of the system.

In some embodiments of the method, sequentially added control algorithms, added to the closed loop logic controller, simultaneously balance the loads of each sequentially added pump and motor combination within the hydraulic system and equalize the wear on all pumps and motors in the system.

Provided herein is a method of controlling a hydraulic charging system comprising: providing a closed loop logic controller comprising multiple control algorithms; wherein a pressure control loop: receives a pressure reading from an electronic pressure sensor located after a plurality of upstream pressure compensated variable displacement hydraulic pumps and at least one accumulator; compares said pressure reading to a pressure setpoint to generate a first control point or setpoint; wherein a first current sensor of at least two current sensors located between a first power source of a plurality of power sources and a first upstream electric motor of a plurality of electric motors driving one of said plurality of upstream pressure compensated variable displacement hydraulic pumps and a second current sensor of the at least two current sensors located between a second power source of the plurality of power sources and a second upstream electric motor of the plurality of electric motors driving one of said plurality of upstream pressure compensated variable displacement hydraulic pumps, each send a load signal to a load balancing control loop and a current sensor selector; wherein the current sensor selector selects the highest load signal in the system and sends that signal to the power limiting control loop and the load control loop; wherein the power limiting control loop: receives the highest load signal from the current sensors of the at least two current sensors and the limit of the output for the load control loop, wherein the load control loop maintains the system load, reduces the power fluctuations on the electrical system, and is limited by the power limiting control loop, wherein a signal from the load control loop is sent out to one of the plurality of pressure control valves and a load balancing incorporation module, and wherein the load balancing incorporation module takes the output signal value of the load balancing control loop and the output signal value of the load control loop to cause the load of the two or more motors to run at the same load and sends a corresponding balanced signal to the plurality of pressure control valves.

Provided herein is a closed loop logic controller for controlling a load in hydraulic charging system, the system comprising three or more processors wherein a first processor determines a first control point based on a comparison of a plurality of pressure readings and a system pressure setpoint, wherein a second processor determines a second setpoint based on a comparison of a plurality of load readings to a load limiting setpoint, wherein a third processor regulates pressure of a hydraulic fluid from at least one hydraulic accumulator in a high-speed manner to control the load of the hydraulic charging system by employing said second control point as a limiting value.

In some embodiments of the closed loop logic controller, the pressure readings are an average of readings derived from a series of pressure readings taken from a plurality of upstream (VDH) pumps.

In some embodiments of the closed loop logic controller, the electronic pressure sensor is located after the plurality of upstream (VDH) pumps and at least one hydraulic accumulator.

In some embodiments, the closed loop logic controller, the plurality of load readings are taken from a plurality of electronic current sensors is located between a plurality of power sources and a plurality of electric motors driving said plurality of upstream VDH pumps.

In some embodiments of the closed loop logic controller, the high-speed manner is defined as adjusting the pressure reading from an electronic pressure sensor taken approximately every 20 milliseconds, or faster.

In some embodiments of the closed loop logic controller, the load of the hydraulic charging system is controlled a signal sent from the third processor to the plurality of VDH pumps and a corresponding plurality of motors.

Provided herein is a method for controlling a load in hydraulic charging system, the method being executed by one or more processors and comprising receiving a pressure reading from an electronic pressure sensor; determining a first control point based on a comparison of said pressure reading to a pressure setpoint; receiving a load reading from an electronic current sensor; determining a second control point based on a comparison of said load reading to a load limiting setpoint; controlling said first control point in a high-speed manner, and regulating pressure of a hydraulic fluid from an at least one hydraulic accumulator to control the load of the hydraulic charging system by employing said second control point as a limiting value.

In some embodiments of the method, the pressure reading is an average reading derived from a series of pressure readings.

In some embodiments of the method, the electronic pressure sensor is located after an upstream pressure compensated hydraulic (VDH) pump and at least one hydraulic accumulator.

In some embodiments of the method, the electronic current sensor is located between a power source and an electric motor driving said VDH pump.

In some embodiments of the method, the high-speed manner is defined as adjusting the pressure reading from an electronic pressure sensor taken approximately every 20 milliseconds, or faster.

In some embodiments of the method, the load of the hydraulic charging system is controlled a signal sent from the third processor to the plurality of VDH pumps and a corresponding plurality of motors.

Additional aspects and advantages of the present disclosure will become readily apparent to those skilled in this art from the following detailed description, wherein only exemplary embodiments of the present disclosure are shown and described, simply by way of illustration of the several modes or best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

Figure 1:
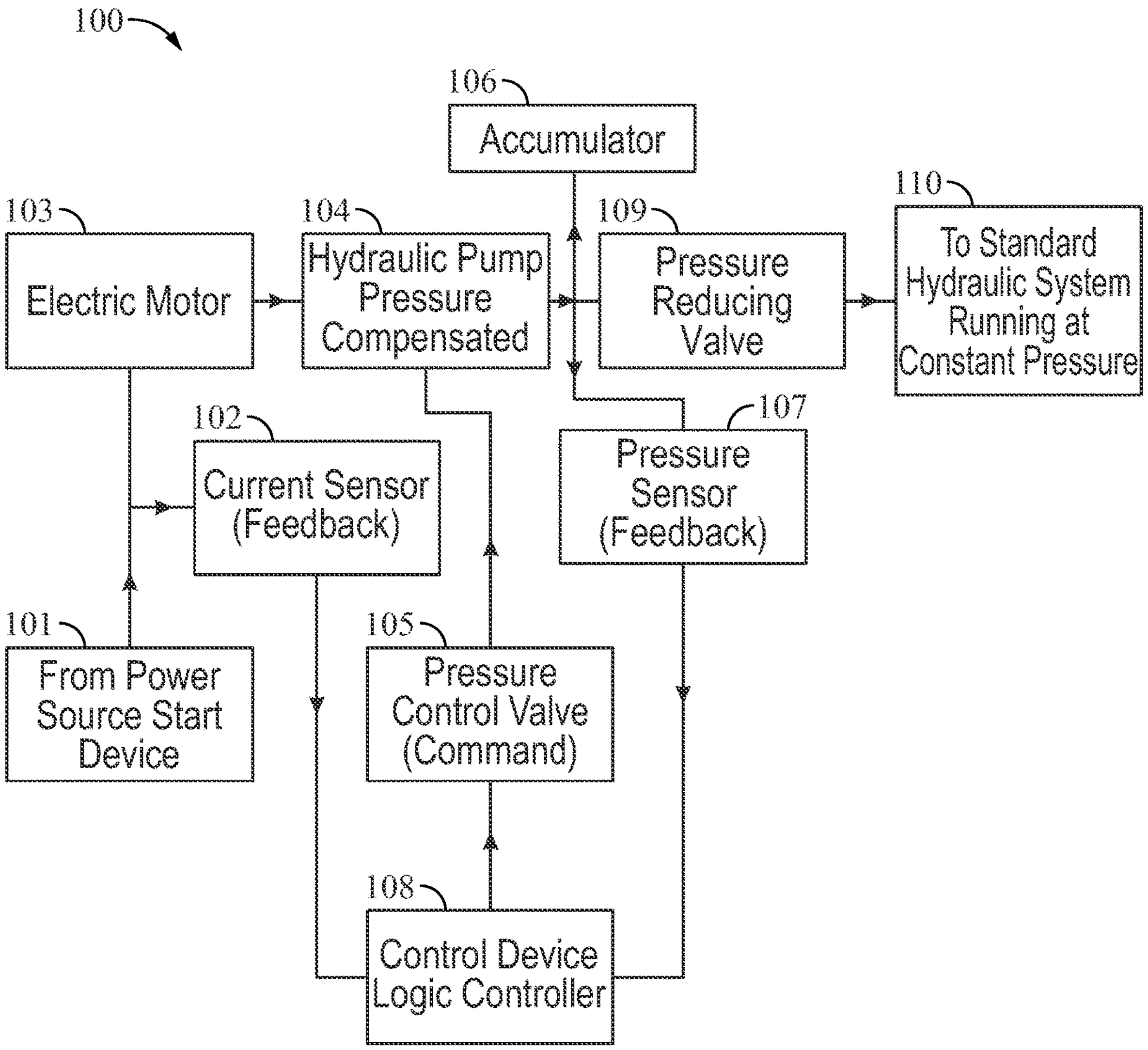
FIG. 1 is a system flowchart of the subject hydraulic charging system with at least one motor and pump combination.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE INVENTION

Hydraulic systems are utilized all over the world for a multitude of applications. Hydraulic systems, and in particular, marine hydraulic systems, are relatively complex and require routine maintenance in order to keep them in top working order Most large sailing and seafaring vessels now utilize hydraulic systems to perform or assist with the functions of many, if not most critical systems on board, often using the same hydraulic system for multiple systems that function simultaneously, causing high cyclic loading and thus high wear on the various electrical and mechanical components of the system as well as the chemical integrity of the hydraulic fluids.

For hydraulic systems that have heavy cyclic loading, and that must maintain a constant pressure, which in turn, tends to cause the hydraulic pump(s) and the motors that drive them to cycle from low load to high loads in very short time spans, (typically less than a second), large volumes of accumulation are required to maintain constant system pressures. When running hydraulic systems with generators on board ships, this cyclic loading can pull the system voltage down and cause "brown outs," which is noticeable by the dimming of lighting running on the same generator(s) throughout the vessel. A typical system may have several accumulators to help mitigate this but that is a (non-controlled) passive system and has a limited effect so a novel hydraulic system is needed that reduces the amount of accumulator a traditional system would require and minimizes the wear and tear on the systems motors and pumps, while increasing its performance.

As used herein, an accumulator is a pressure storage reservoir in which a non-compressible hydraulic fluid is held under pressure that is applied by an external source of mechanical energy. It is a type of energy storage device. An accumulator enables a hydraulic system to cope with extremes of demand, often using a less powerful pump, to respond more quickly to a temporary demand, and to smooth out pulsations, often resembling knocking heard in some systems. Further, as used herein, the term "accumulation" refers to a volume of non-compressible hydraulic fluid stored under pressure.

A system is described herein which was particularly designed for the marine industry due to the closed electrical systems running on a generator where sudden load spikes pull down the supply voltage throughout the vessel.

Fortunately, this system can be adapted and expanded to any hydraulic system that requires vast hydraulic accumulation to maintain system pressure on a pressure compensated, variable displacement hydraulic (VDH) pump or pumps which experience heavy cyclic loading.

A second aspect of this system is the ability to use the same equipment to limit the power draw on the electric motor.

A third aspect of this system is the ability to balance the load between multiple pumps (and motors) within the same hydraulic systems.

Among the many benefits that will become apparent to a person skilled in the art upon reading this disclosure are the following:

- The described system greatly reduces the power fluctuations seen on the electric system.
- The described system has "built-in" power limiting; allowing the use of more common pressure compensated, variable displacement hydraulic (VDH) pumps.
- The described system results in a reduction of system accumulators.
- The described system results in load balancing between pump/motors when using multiple pump/motor combinations on single hydraulic systems, which in turn equalizes wear throughout a system.

The hydraulic control system described herein uses one system pressure sensor as a system pressure feedback or transducer and is the component that is being varied. Each pump/motor combination in the system has one current sensor or transducer as another feedback signal, for load monitoring on the motor, and one electronic control pressure relief valve, to vary the system target pressure. Those feedback signals go back to the closed loop controller, which oversees the function of keeping the loads constant, while limiting the power that each pump draws from a motor and balances the load between multiple motors. Surprisingly, it was found that in order to accommodate systems that require constant pressure, the use of a pressure reducing valve, placed after the power pack, can be used, which in turn helps with controllability of servo valves or other similar valves.

As used herein a transducer is a device that converts energy from one form to another. Usually a transducer converts a signal in one form of energy to a signal in another. Transducers are often employed at the boundaries of automation, measurement, and control systems, where electrical signals are converted to and from other physical quantities (energy, force, torque, light, motion, position, etc.). The process of converting one form of energy to another is known as transduction. Transducers that convert physical quantities into electrical quantities are known as electrical transducers. For example, a thermocouple that changes temperature differences into a small voltage, or a Linear variable differential transformer (LVDT) used to measure displacement. Alternatively, transducers that convert physical quantities into mechanical quantities are known as mechanical transducers; such as torsion bars that convert torque into displacement and strain.

Figure 5:
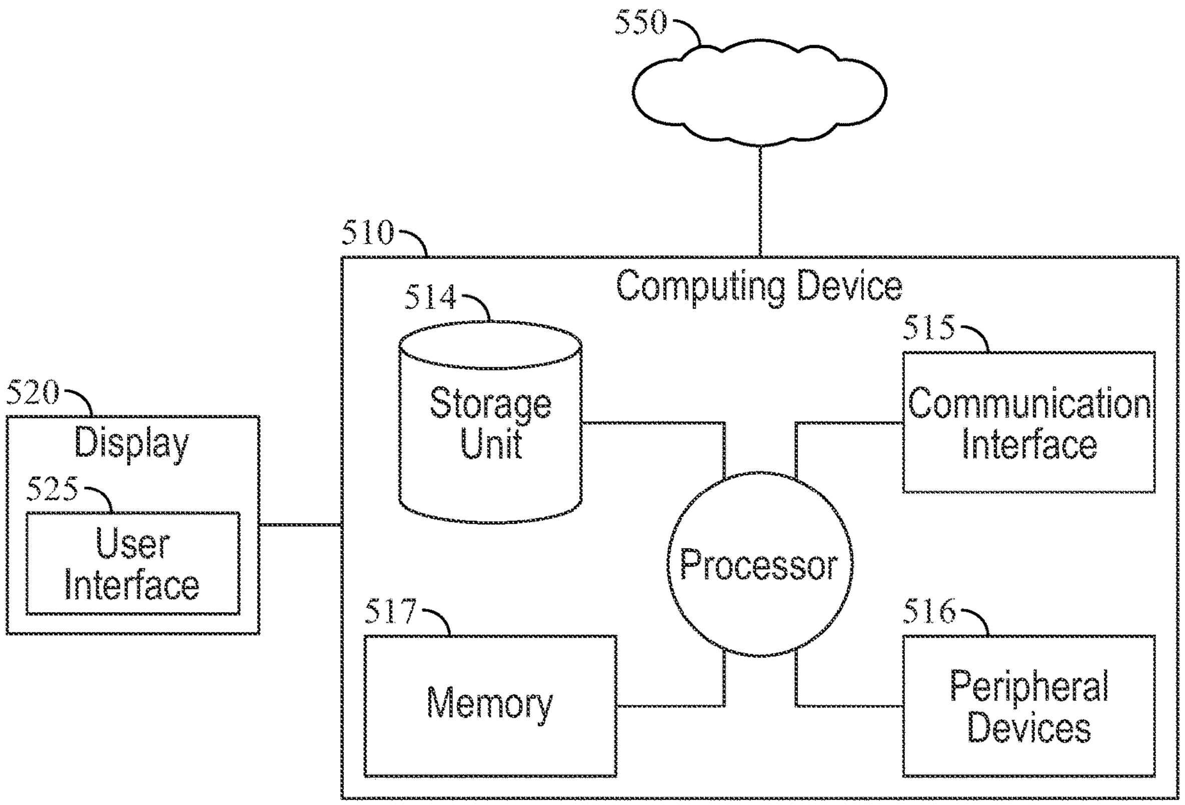
FIG. 5 is a shows a non-limiting example of a computing device; in this case, a device with one or more CPUs, a memory, a communication interface, and a display.

As described in more detail below, FIG. 5 shows a non-limiting example of a computing device; in this case, a device with one or more CPUs, a memory, a communication interface, and a display.

Computing Devices and Processors

In some embodiments, the platforms, systems, media, and methods described herein include a computing device, processors, or use of the same. In further embodiments, the computing device includes one or more hardware central processing units (CPUs) or general-purpose graphics processing units (GPUs) that carry out the device's functions. In still further embodiments, the computing device further comprises an operating system configured to perform executable instructions. In some embodiments, the computing device is optionally connected a computer network. In further embodiments, the computing device is optionally connected to the Internet such that it accesses the World Wide Web. In still further embodiments, the computing device is optionally connected to a cloud computing infrastructure. In other embodiments, the computing device is optionally connected to an intranet. In other embodiments, the computing device is optionally connected to a data storage device.

In accordance with the description herein, suitable computing devices include, by way of non-limiting examples, cloud computing resources, server computers, server clusters, desktop computers, laptop computers, notebook computers, sub-notebook computers, netbook computers, netpad computers, handheld computers, mobile smartphones, and tablet computers. Those of skill in the art will recognize that many smartphones are suitable for use in the system described herein. Suitable tablet computers include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, WAGO Programable Logic Controller (PLC), FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the computing device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the computing device is not powered. In further embodiments, the non-volatile memory comprises flash memory. In some embodiments, the non-volatile memory comprises dynamic random-access memory (DRAM). In some embodiments, the non-volatile memory comprises ferroelectric random-access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the computing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with a computer, such as a virtual reality (VR) headset. In further embodiments, suitable VR headsets include, by way of non-limiting examples, HTC Vive, Oculus Rift, Samsung Gear VR, Microsoft HoloLens, Razer Open-Source Virtual Reality (OSVR), FOVE VR, Zeiss VR One, Avegant Glyph, Freefly VR headset, and the like. In still further embodiments, the display is a combination of devices such as those disclosed herein.

In a preferred embodiment the computing device utilizes a WAGO PLC and CODESYS is the development software, each of which are controlled thru a Windows based Human Machine Interface (HMI).

In some embodiments, the computing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

In a preferred embodiment the computing device utilizes a WAGO PLC and CODESYS is the development software, each of which are controlled thru a Windows based Human Machine Interface (HMI).

Computer control systems are provided herein that can be used to implement the platforms, systems, media, and methods of the disclosure. FIG. 5, depicts an example computing device 500 that can be programmed or otherwise configured to implement platforms, systems, media, and methods of the present disclosure.

In the depicted embodiment, the computing device 510 includes a CPU (also "processor" and "computer processor" herein) 512, which is optionally a single core, a multi core processor, or a plurality of processors for parallel processing. The computing device 510 also includes memory or memory location 517 (e.g., random-access memory, read-only memory, flash memory), electronic storage unit 514 (e.g., hard disk), communication interface 515 (e.g., a network adapter) for communicating with one or more other systems, and peripheral devices 520, 525, such as cache, other memory, data storage, user interface or electronic display adapters.

In some embodiments, the memory 517, storage unit 514, interface 515 and peripheral devices 520, 525 are in communication with the CPU 512 through a communication bus (solid lines), such as a motherboard. The storage unit 514 comprises a data storage unit (or data repository) for storing data. The computing device 510 is optionally operatively coupled to a computer network, such as the network 550 depicted in FIG. 5, with the aid of the communication interface 525.

In some embodiments, the CPU 512 can execute a sequence of machine-readable instructions, which can be embodied in a program or software. The instructions may be stored in a memory location, such as the memory 517. The instructions can be directed to the CPU 512, which can subsequently program or otherwise configure the CPU 512 to implement methods of the present disclosure. Examples of operations performed by the CPU 512 can include fetch, decode, execute, and write back. In some embodiments, the CPU 512 is part of a circuit, such as an integrated circuit. One or more other components of the computing device 510 can be optionally included in the circuit. In some embodiments, the circuit is an application specific integrated circuit (ASIC) or a field programmable gate array (FPGA).

In some embodiments, the storage unit 514 can store files, such as drivers, libraries and saved programs. In some embodiments, the storage unit 514 stores data, such as detection logic; analysis of various threats that have been encountered by an enterprise; metadata regarding triage performed to mitigate threats, false positives, and performance metrics, and so forth. In some embodiments, the computing device 510 includes one or more additional data storage units that are external, such as located on a remote server that is in communication through an intranet or the Internet.

In some embodiments, the computing device 510 communicates with one or more remote computer systems through a network. For instance, the computing device 510 can communicate with a remote computer system. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants, such as depicted in FIG. 5. In some embodiments, a user can access the computing device 510 via a network 550, such as depicted in FIG. 5.

In some embodiments, the platforms, systems, media, and methods as described herein are implemented by way of machine (e.g., computer processor) executable code stored on an electronic storage location 514 of the process device, such as, for example, on the memory 517 or the electronic storage unit 514. In some embodiments, the CPU 512 is adapted to execute the code. In some embodiments, the machine executable or machine-readable code is provided in the form of software. In some embodiments, during use, the code is executed by the CPU 512. In some embodiments, the code is retrieved from the storage unit 514 and stored on the memory 517 for ready access by the CPU 512. In some situations, the electronic storage unit 514 is precluded, and machine-executable instructions are stored on the memory 517. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 510 can include or be in communication with an electronic display 520. In some embodiments, the electronic display 520 provides a user interface (UI) 525. In a preferred embodiment the computing device 510 utilizes a WAGO PLC controlled thru a Windows based Human Machine Interface (HMI).

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the computing device's CPU, written to perform one or more specified tasks. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages. One such development environment for programming controller applications as used herein is CODESYS, for engineering control systems. The software suite covers different aspects of industrial automation technology with one surface. The tool is independent from device manufacturers and thus used for hundreds of different controllers, PLCs (programmable logic controllers), PAC (programmable automation controllers), ECUs (electronic control units), controllers for building automation and other programmable controllers mostly for industrial purposes.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight , Java™, and Unity®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Provided herein is a hydraulic charging system comprising: at least one power source; at least one electric motor; at least one current sensor; (transducer—feedback 1); at least one variable displacement hydraulic (VDH) pump; at least one electronic pressure control valve; a hydraulic fluid accumulator; an electronic pressure sensor; (transducer—feedback 2); and a closed loop logic controller comprising multiple control algorithms; wherein the at least one power source provides power to the at least one electric motor, the at least one electric motor drives the at least one (VDH) pump, the at least one current sensor electronically monitors the load draw of the at least one motor during operation, and the at least one VDH Pump pressurizes a hydraulic fluid until it reaches a varying setpoint of the at least one pressure control valve, and charges the accumulator to a pressure that is equal to or higher than the system pressure requirements; (to allow a typical system pressure to vary anywhere between about 2000 psi and about 3000 psi in order to provide load control on the motors with the goal of keeping the load as constant as possible), wherein the system hydraulic fluid pressure is electronically monitored by the pressure sensor, wherein the at least one current sensor and the pressure sensor provide feedback readings to the closed loop logic controller, and wherein the closed loop logic controller processes the at least one current sensor reading and the pressure sensor reading using the multiple control algorithms, (which in a preferred embodiment may be three or more), to generate commands to the at least one electronic pressure control valve to maintain a constant desired load condition of the at least one variable displacement hydraulic (VDH) pump and therefor the load on the at least one electric motor.

In some embodiments, the hydraulic charging system further comprises a downstream pressure reducing valve downstream from the pressure control valve to hold a downstream system pressure fixed irrespective of the pressure measured at the pressure control valves.

In some embodiments, the hydraulic charging system is adapted to hydraulic systems powered by generator power sources.

In some embodiments, the hydraulic charging system is specifically adapted to marine hydraulic systems such as those deployed for large sailing and seafaring vessels.

In some embodiments, the hydraulic charging system is adapted to other high-power hydraulic systems powered by generator power sources, such as those deployed for construction equipment power systems, emergency power backup power systems or aviation systems, to name but a few.

As shown in FIG. 1, the inventive hydraulic system 100, illustrates a primary power source 101, such as a VFD (variable frequency drives), OSD (one speed drives), and/or Delta-Wye starters, to name but a few to start the electric motor 103. A current sensor or transducer 102 (acting as a second feedback loop for the system), monitors the load draw/current draw of the electric motor 103 during operation and is used as one of the parameters of feedback control. The load condition measured by the at least one current sensor changes both slowly over time when taking a running average (over 10-90 seconds) and dynamically when looked at instantaneous running averages (over 0.2-5 seconds).

Figure 3:
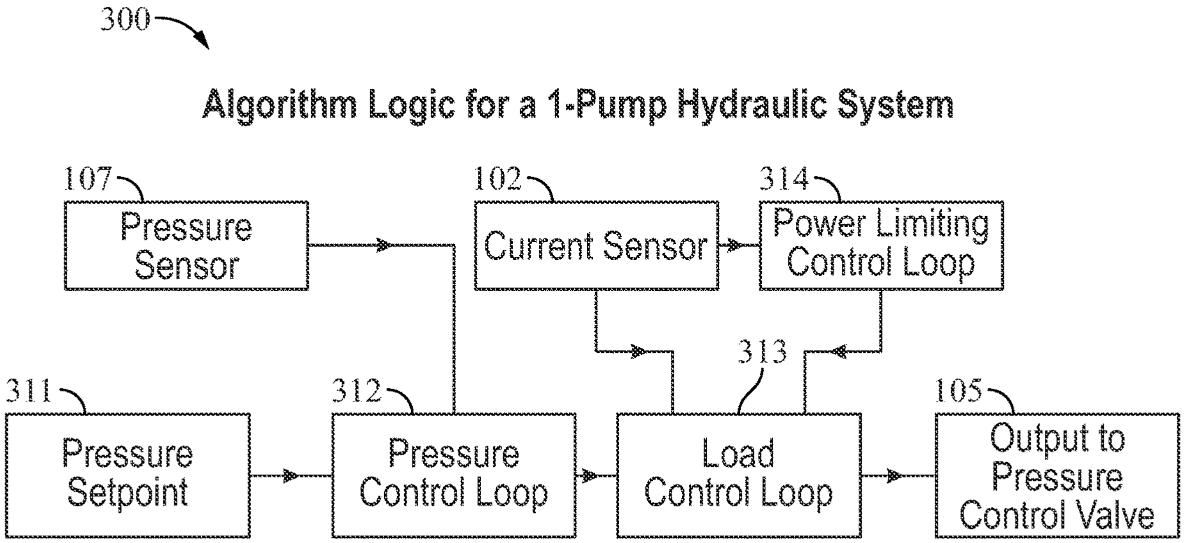
FIG. 3 is a flowchart of an algorithm logic for a 1-pump/motor combination hydraulic system of the subject hydraulic charging system.

In some embodiments of the hydraulic charging system, the load condition measured by the at least one current sensor is maintained constant by the load control loop 313 of the control algorithm 300, as shown in FIG. 3, described in further detail below.

In some embodiments of the hydraulic charging system, the load condition is maintained by increasing a pressure setting controlled by the load control loop 313 of the control algorithm for the electronic pressure control valve 109 when the system demand is reduced or decreasing.

In some embodiments of the hydraulic charging system, the at least one VDH pump 104 imposes loads on the at least one electric motor 102 such that based on the flow and pressure output, one can increase or decrease the load by adjusting the pressure of the control valve 105 using the load control loop 313 of the control algorithm.

In some embodiments of the hydraulic charging system, the load condition is maintained by decreasing the pressure setting of the electronic pressure control valve 105 when the system demand is increased or raised using the load control loop 313 of the control algorithm.

In some embodiments of the hydraulic charging system, downstream increases in the system flow 110 cause hydraulic fluid to be released from the accumulator 106 into the system.

In some embodiments of the hydraulic charging system, the released hydraulic fluid from the accumulator causes a first control loop in the logic controller to compare target pressures versus current pressure and is directed to maintain an average pressure value using the pressure control loop 312 of the control algorithm.

In some embodiments of the hydraulic charging system, the pressure control loop 312 of the control algorithm of the logic controller issues a command to the at least one electronic pressure control valve to reduce pressure in order to maintain a constant average percent load as measured at the at least one current sensor and wherein the constant average percent load is relayed to a closed sequential control loop.

In any given embodiment of the hydraulic charging system, the load conditions being sensed by the electronic pressure sensor and the current sensor vary depending on the application of the hydraulic system. In other words, the known parameters for a desired downstream system pressure will vary, depending on the application requirements. For example, some hydraulic systems may require a nominal desired 1,000 psi pressure. So, as long as the minimum pressure sensed by the electronic pressure sensor remains greater than 1000 psi, the system downstream will continue to function normally, without intervention from the closed loop logic controller.

In any given embodiment of the hydraulic charging system, a minimum pressure can be set on the pressure control loop to keep the downstream pressure at the required value, regardless of what the hydraulic charge systems is doing.

In some embodiments of the hydraulic charging system, the output load of the pump is capable of being limited up to 100% load by lowering the system pressure. In some embodiments, power limiting of the pump is controlled in order to prevent the motors from drawing more current than the motors are rated for. In some embodiments the power of the motors is controlled by Power Limiting Control Loop 314 in the sequential control loop of the closed loop logic controller 300.

The electric motor drives a pressure compensated, variable displacement hydraulic (VDH) pump 104 which builds pressure in the system by forcing hydraulic fluid through the system until it reaches a given setpoint of the pressure control valve 105 and charges or pressurizes a hydraulic accumulator 106. (For example: A typical hydraulic charging system pressure may vary anywhere between about 2000 psi and about 3000 psi in order to provide load control on the motors with the goal of keeping the load as constant as possible).

While the accumulator is being charged, the pressure is being monitored electronically by the pressure sensor 107 (a second transducer) which is used as a first feedback control. The two feedback control signals are fed into the closed loop logic controller 108, which can be any device that provides a closed loop control such as, but not limited to a Programmable Logic Controller (PLC), microcontroller, and so on, comprising multiple control algorithms, (which in in a preferred embodiment may be three or more algorithms). The two signals are processed by the multiple control algorithms and generate commands to the pressure control valve and the command to the pressure control valves 105 is varied to reach the desired loading conditions.

In some embodiments of the hydraulic charging system a pressure reducing valve 109 is used with the system, to maintain a constant downstream pressure to improve controllability of valves such as but not limited to servo valves and/or flow control valves.

In some embodiments, to maintain a constant load at the current sensor 102, the pressure control valve 105 setting is increased while the system load demand is reduced or decreasing, which causes the pressure to rise in the accumulator 106, increasing the amount of stored hydraulic oil. When the system load increases downstream after the pressure reducing valve 109, the pressurized hydraulic fluid stored in the accumulator 106 is then released into the system. Next, the command to the pressure control valve 105 is reduced to maintain a more constant value on the current sensor 102. To do this, one control loop within the logic controller 108, directs the pressure reducing valve 109 to open or close appropriately in order to maintain a constant load. That adjustment value is then passed to the next control loop within the logic controller Since the hydraulic pump 104 imposes load on the electric motor 103, based on the flow and pressure output, one can increase or decrease the load by adjusting the pressure at the control valve 105, up or down respectively.

As long as the minimum pressure at the pressure sensor 107 remains higher than the system pressure required downstream 110, the system will function identically, due to the pressure reducing valve 109.

Since one would be monitoring the load draw from the motor with the current sensor 102, one can also limit the power output of the pump by lowering the pressure if the power output starts to reach the limit of the electric motor 103.

As noted previously, the closed loop logic controller for the single pump/motor combination processes the at least one current sensor reading and the pressure sensor reading using multiple control algorithms, (which in a preferred embodiment may be three or more), to generate commands to the at least one electronic pressure control valve to maintain a constant desired load condition of the at least one variable displacement hydraulic (VDH) pump and therefore the at least one electric motor. In some embodiments, at least one current sensor reading may come from the Power Source Start Device.

As shown in FIG. 3, provided herein is a closed loop logic controller 300 for controlling a hydraulic charging system having multiple control algorithms comprising; a pressure control loop 312, a power limiting control loop 314 and a high speed load control loop 313; wherein the pressure control loop receives an average pressure reading from an electronic pressure sensor 107 located after an upstream pressure compensated variable displacement hydraulic (VDH) pump 104 and at least one accumulator 106 and compares said pressure reading to a pressure setpoint 311 to generate a first control point, wherein the power limiting control loop 314 receives a load reading from an electronic current sensor 102 located between a power source and an electric motor 103 driving said (VDH) pump and compares said load reading to a load limiting setpoint and generates a second control point, wherein said pressure control loop 312 forwards the first control point and said power limiting control loop 314 forwards the second control point to a high speed load control loop 313; and wherein the high speed load control loop 313 controls the first control point in a high speed manor and utilizes the second control point as a limiting value to regulate pressure of a hydraulic fluid from the at least one hydraulic accumulator 106, to control the load of the system by sending an output signal to a pressure control valve 105 to increase or decrease pressure appropriately, thereby also maintaining the average load of a corresponding electric motor 103.

In some embodiments of the hydraulic charging system, the load condition is maintained by increasing a pressure setting controlled by the load control loop 313 of the control algorithm for the electronic pressure control valve 109 when the system demand is reduced or decreasing.

In some embodiments of the hydraulic charging system, the at least one VDH pump 104 imposes loads on the at least one electric motor 102 such that based on the flow and pressure output, one can increase or decrease the load by adjusting the pressure of the control valve 105 using the load control loop 313 of the control algorithm.

In some embodiments of the hydraulic charging system, the load condition is maintained by decreasing the pressure setting of the electronic pressure control valve 105 when the system demand is increased or raised using the load control loop 313 of the control algorithm.

Provided herein is a method of controlling a hydraulic charging system 100 comprising: providing a closed loop logic controller 300 comprising multiple control algorithms; wherein a pressure control loop 312: receives an average pressure reading from an electronic pressure sensor 107 located after an upstream pressure compensated variable displacement hydraulic (VDH) pump 104 and at least one hydraulic accumulator 106, compares said pressure reading to a pressure setpoint 311 to generate a first control point; wherein a power limiting control loop 314: receives a load reading from an electronic current sensor 102 located between a power source 101 and an electric motor 103 driving said VDH pump 104, compares said load reading to a load limiting setpoint and generates a second control point; wherein said pressure control loop 312 forwards the first control point and said power limiting control loop 314 forwards the second control point to a high speed load control loop 313 and wherein said high speed load control loop 313 controls the first control point in a high speed manner (approximately every 20 millisecond or faster) and utilizes the second control point as a limiting value to regulate pressure of a hydraulic fluid from the at least one hydraulic accumulator 106 to control the load of the system by sending an output signal to a pressure control valve 105 to increase or decrease pressure appropriately, thereby also maintaining the average load of a corresponding electric motor 103.

As shown in FIG. 3, provided herein is a hydraulic charging system 200 comprising: two or more power sources 201A, 201B; two or more electric motors 203A, 203B; two or more current sensors 202A, 202B; two or more variable displacement hydraulic (VDH) pumps 204A, 204B; two or more electronic pressure control valves 205A, 205B; at least one hydraulic fluid accumulator 206; an electronic pressure sensor 207, and a closed loop logic controller 208 comprising multiple control algorithms to balance the loading of the two or more electric motors; wherein the two or more power sources 201A, 201B provide power to the two or more electric motors 203A, 203B, the two or more electric motors drive the two or more (VDH) pumps 204A, 204B, the two or more current sensors 202A, 202B electronically monitor the load draw of the two or more motors 203A, 203B during operation, and the two or more VDH pumps 204A, 204B pressurize a hydraulic fluid until it reaches a setpoint of each of the two or more pressure control valves 205A, 205B, and charges the at least one accumulator 206 to a pressure that is equal to or higher than the system pressure requirements; wherein the system hydraulic fluid pressure is electronically monitored by the pressure sensor 207; wherein the two or more current sensors 202A, 202B and the pressure sensor 207 provide feedback readings to the closed loop logic controller 208, and wherein the multiple control algorithms of the closed loop logic controller process the two or more current sensor readings and the pressure sensor reading to generate commands to the two or more electronic pressure control valves 205A, 205B to maintain desired constant loading conditions of the two or more variable displacement hydraulic (VDH) pumps 204A, 204B and therefore the desired constant loading conditions the two or more electric motors 203A, 203B. In some embodiments, at least one current sensor reading may come from the Power Source Start Device.

In some embodiments of the hydraulic charging system, the system further comprises a downstream mechanical pressure reducing valve 209 to hold a downstream system pressure 210 fixed irrespective of the pressure measured at the pressure control valves 205A, 205B.

In some embodiments, the hydraulic charging system is adapted to hydraulic systems powered by generator power sources.

In some embodiments, the hydraulic charging system is adapted to marine hydraulic systems.

In some embodiments, the hydraulic charging system is adapted to construction equipment power systems, emergency power back-up systems or aviation systems.

In some embodiments, the hydraulic charging system is adaptable to any system that requires a constant load draw from the available power source wherein the hydraulic system fluctuates causing the power source to act in a negative behavior, such as, but not limited to voltage drops, frequency drops, or current spikes.

Figure 2:
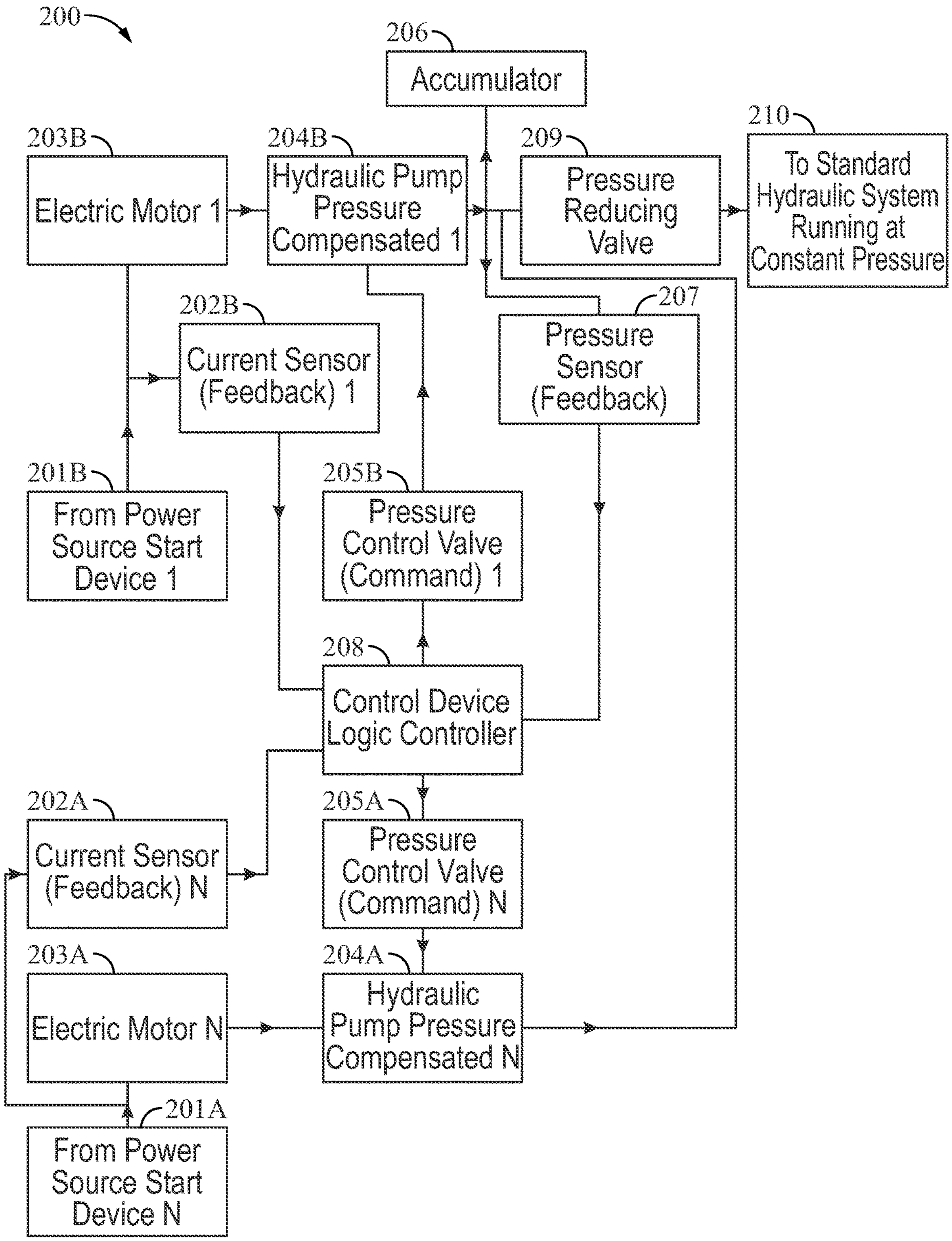
FIG. 2 is a system flowchart of the subject hydraulic charging system with two or more motor and pump combinations.

The inventive hydraulic system can also be used in a multiple motor/pump configuration connected to one closed loop logic control, as seen in FIG. 2. While using this configuration, at least one additional control algorithm must be used in the closed logic controller to balance out the loading of all the motors, which use the current sensors as feedback and makes small adjustments to the control valves. This gives an additional advantage of maintaining similar wear throughout the system.

Referring now to FIG. 2, the system flowchart of the inventive hydraulic charging system 200 is illustrated with two or more (a plurality) motors 203A, 203B and two or more (a plurality) pump combinations 204A, 204B. the inventive hydraulic system 200, illustrates two or more (a plurality) primary power sources 201A, 201B, or generators, capable of providing power necessary to start the two or more (a plurality) electric motors 203A, 203B.

Typical electric motors may again include, but are not limited to, VFD (variable frequency drives), OSD (one speed drives), Delta-Wye starters, to name but a few. Two or more (a plurality) current sensors or transducers 202A, 202B (acting as a first feedback loop set for the system), monitor the load draw/current draw of the two or more electric motor 203A, 203B during operation and are used as one of the parameters of feedback control to be further described below.

The electric motors drive the pressure compensated, variable displacement hydraulic (VDH) pumps 204A, 204B which build pressure in the system by forcing hydraulic fluid through the system until it reaches a given setpoint of the two or more (a plurality) pressure control valves 205A, 205B and charges or pressurizes the at least one hydraulic accumulator 206.

While the accumulator is being charged, the pressure is being monitored electronically by the pressure sensor 207 (a second transducer), which is used as a first feedback loop set for the system). The two feedback control signals are fed into the closed loop logic controller 208, which can be any device that provides a closed loop control such as, but not limited to a Programmable Logic Controller (PLC), microcontroller, and so on, comprising multiple control algorithms. The two signals are processed by the multiple algorithms, (which in a preferred embodiment may be four or more algorithms) and the controller generates commands to the plurality of pressure control valves 205A, 205B which may be varied to reach the desired loading conditions.

In a preferred embodiment, the accumulator charging system may utilize a WAGO PLC and CODESYS program logic thru a Windows based Human Machine Interface (HMI).

In some embodiments of the hydraulic charging system a pressure reducing valve 209 is used with the system, to maintain a constant downstream pressure to improve controllability of valves such as but not limited to servo valve and flow control valves. Another novel aspect of the system is that when using the pressure reducing valve 209 with this system, the load downstream, has a fixed average load 210 (if taken over the proper interval) that slowly changes over time, even though the system pressure measured at the plurality of pressure control valves 205A, 205B may instantaneously fluctuate from low load to high load downstream. The load condition measured by the two or more current sensor changes both slowly over time when taking a running average (over 10-90 seconds) and dynamically when looked at instantaneous running averages (over 0.2-5 seconds).

To maintain that constant load at the plurality of current sensors 202A, 202B, the plurality of pressure control valves 205A, 205B settings are increased while the system load demand is reduced or decreasing, which causes the pressure to rise in the at least one accumulator 206, increasing the amount of stored hydraulic oil. When the system load (pressure) increases downstream at the control valve 209, the extra oil stored in the at least one accumulator 206 is then released into the system. Next, the command to the plurality of pressure control valves 205A, 205B is reduced to maintain a more constant value on the plurality of current sensors 202A, 202B. To do this, one control loop within the logic controller 108, and directs the pressure reducing valve 209 to open or close appropriately in order to maintain an average pressure value. That adjustment value is fed into the next control loop Since the plurality of hydraulic pumps 204A, 204B impose loads on the plurality of electric motors 203A, 203B, based on the flow and pressure output, one can increase or decrease the load by adjusting the pressure at the plurality of control valves 205A, 205B, up or down respectively.

As long as the minimum pressure at the pressure sensor 207 remains higher than the system pressure required downstream at 210, the system will function identically, due to the pressure reducing valve 209.

Since one would be monitoring the load draw from the two or more electric motors 203A, 203B with the current sensors 202A, 202B, one can also limit the power output of the pumps 204A, 204B, by lowering the pressure, if the power output starts to reach the limit of one or more of the two or more electric motors 203A, 203B.

As noted previously, the closed loop logic controller for a multi-pump/motor combination processes the multiple current sensor readings and the pressure sensor reading using multiple control algorithms, (which in a preferred embodiment may be four or more), to generate commands to the two or more electronic pressure control valves to maintain a constant desired load condition of the two or more variable displacement hydraulic (VDH) pumps and the at two or more electric motors. In some embodiments, at least one current sensor reading may come from the Power Source Start Device.

For a multiple motor/pump configuration connected to one closed loop logic control, the principals are the same as for a single pump/motor configuration.

Figure 4:
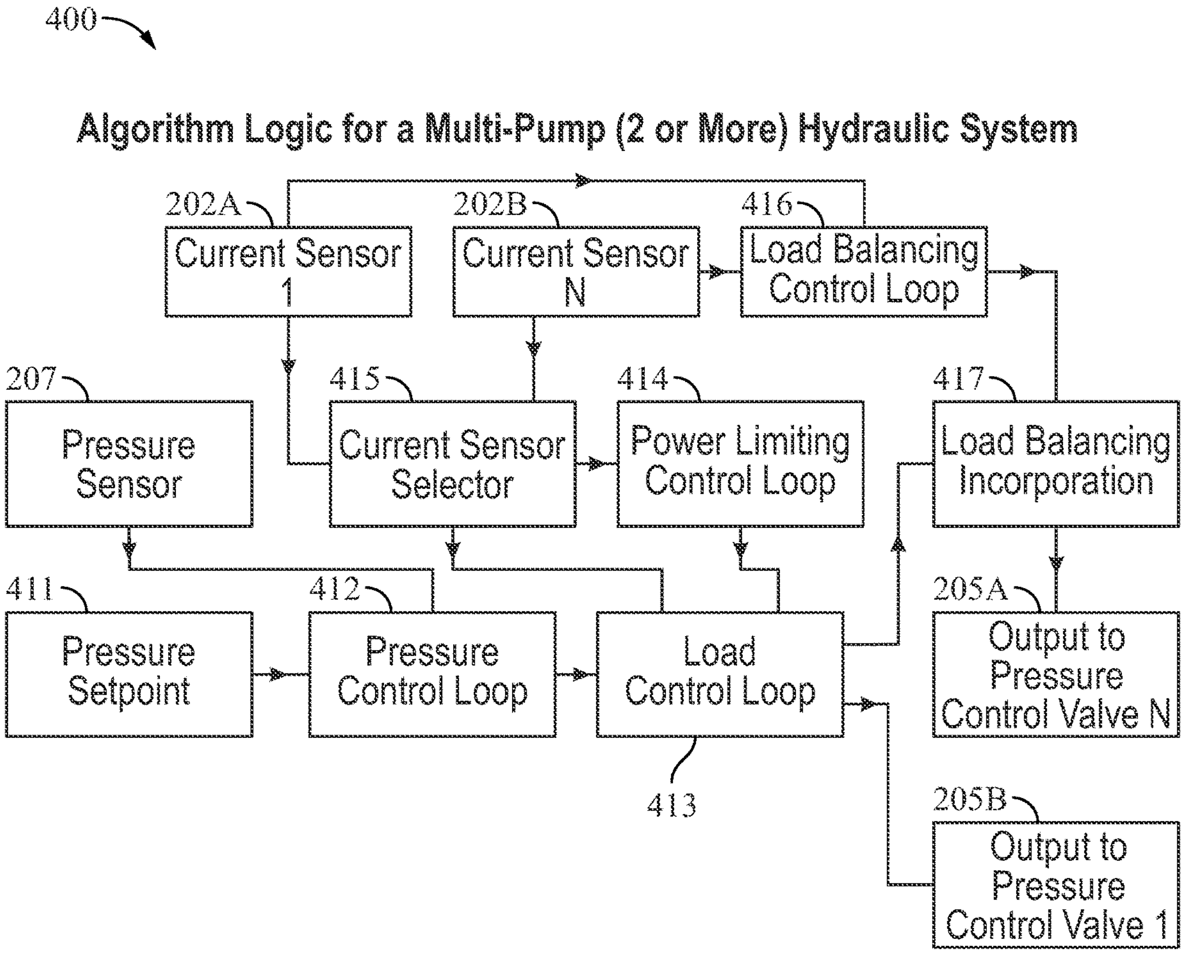
FIG. 4 is a flowchart of an algorithm logic for a multi-pump/motor combination hydraulic system of the subject hydraulic charging system.

As shown in FIG. 4, the algorithms in the closed loop logic controller receive signals transmitted by the pressure sensor and multiple current sensors and compare them to desired setpoints to determine appropriate load leveling commands to transmit out to the pressure control valves in order to control fluid pressure from the accumulator, thus maintaining the average loads of the valves and therefore the corresponding loads of the adjoined motors.

Referring now to FIG. 4, provided herein is a closed loop logic controller 400 for controlling a hydraulic charging system having multiple control algorithms comprising; a pressure control loop 412, a load balancing control loop 416, a current sensor selector 415, a power limiting control loop 414; and a high speed load control loop 413; wherein the pressure control loop 412 receives an average pressure reading from an electronic pressure sensor 207 located after two or more (a plurality) upstream pressure compensated variable displacement hydraulic (VDH) pumps 204A, 204B and at least one accumulator 206 and compares said pressure reading to a pressure setpoint 411 to generate a first control point, wherein a load balancing control loop 416 and a current sensor selector 415 each receive a load signal from two or more current (a plurality) sensors 202A, 202B, wherein the current sensor selector 415 selects the highest current in the system and sends that signal to the power limiting control loop 414 and the load control loop 413, wherein the power limiting control loop 414 receives the highest load signal from the current sensors of the at least two current sensors 202A, 202B and the limit of the output for the high speed load control loop 413, wherein the high speed load control loop 413 maintains the system load, reduces the power fluctuations on the electrical system, and is limited by the power limiting control loop 414, wherein the load control loop 413 transmits a signal to one of the plurality of pressure control valves 205A, 205B and a load balancing incorporation module 417, wherein the load balancing incorporation module 417 receives the output of the load balancing control loop signal value and the load control loop signal value to cause the load of the two or more (a plurality) motors 203A, 203B to run at the same load and sends a corresponding balanced signal to the plurality of pressure control valves 205A, 205B.

Provided herein is a method of controlling a hydraulic charging system 200 comprising: providing a closed loop logic controller 400 comprising multiple control algorithms; wherein a pressure control loop 412 receives a pressure reading from an electronic pressure sensor 207 located after a plurality of upstream pressure compensated variable displacement hydraulic pumps 204A, 204B and at least one accumulator 206; compares said pressure reading to a pressure setpoint 411 to generate a first control point; wherein a first current sensor 202A of at least two current sensors located between a first power source 201A of a plurality of power sources and a first upstream electric motor 203A of a plurality of electric motors driving one of said plurality of upstream pressure compensated variable displacement hydraulic pumps 204A, 204B and a second current sensor 202B of the at least two current sensors located between a second power source 201B of the plurality of power sources and a second upstream electric motor 203B of the plurality of electric motors driving one of said plurality of upstream pressure compensated variable displacement hydraulic pumps, each send a load signal to a load balancing control loop 416 and a current sensor selector 415; wherein the current sensor selector 415 selects the highest current in the system and sends that signal to the power limiting control loop 414 and the load control loop 413; wherein the power limiting control loop 414 receives the highest load signal from the current sensors of the at least two current sensors 202A, 202B and the limit of the output for the load control loop 413, wherein the load control loop 413 maintains the system load, reduces the power fluctuations on the electrical system, and is limited by the power limiting control loop 414, wherein a signal from the load control loop 413 is sent out to one of the pressure control valves 205A, 205B and a load balancing incorporation module 417, and wherein the load balancing incorporation module 417 takes the output signal value of the load balancing control loop 416 and the output signal value of load control loop 413 to cause the load of the two or more motors 203A, 203B to run at the same load and sends a corresponding balanced signal to the plurality of pressure control valves 205A, 205B.

Provided herein is a method of reducing cyclic loading in a hydraulic system comprising: providing at least one electric motor; providing at least one current sensor (also known as a transducer—feedback system—2); providing at least one pressure compensated, variable displacement (VDH) pump; providing at least one electronic pressure control valve; providing at least one hydraulic fluid accumulator;

providing an electronic pressure sensor (pressure sensor transducer feedback—1); and providing a closed loop logic controller comprising multiple control algorithms; wherein the at least one power source provides power to the at least one electric motor to drive the at least one (VDH) pump, which charges the at least one accumulator to a pressure that is equal to or higher than the system pressure requirements; (wherein a typical system pressure will vary anywhere between about 2000 psi and about 3000 psi in order to provide load control on the motors with the goal of keeping the load as constant as possible) and pressurizes a hydraulic fluid until it reaches a setpoint of the at least one electronic pressure control valve, wherein the at least one current sensor electronically monitors the load draw of the at least one motor during operation and the system hydraulic fluid pressure is electronically monitored by the pressure sensor; wherein the at least one current sensor and the pressure sensor provide feedback readings to the closed loop logic controller, and the multiple algorithms of the closed loop logic controller process the at least one current sensor reading and the pressure sensor reading using the multiple control algorithms (which in a preferred embodiment may be 3 or more) to generate commands to the at least one electronic pressure control valve to reduce cyclic load spikes in the loading conditions of the at least one variable displacement hydraulic (VDH) pump and therefore, the at least one electric motor.

In some embodiments of the method; further providing a downstream pressure reducing valve to hold a downstream system pressure fixed irrespective of the pressure measured at the at least one pressure control valve.

In some embodiments of the method, the size or volume of the at least one hydraulic accumulator can be reduced to within a range between about 60% to about 80% of a system not incorporating this control system without affecting performance of the system.

In some embodiments of the method, sequentially added control algorithms, added to the closed loop logic controller, balance loads of each sequentially added pump/motor combination within a hydraulic system and therefore equalizes wear on all pumps and motors in the system.

It should further be noted that one of skill in the art would recognize upon this disclosure that in any one of the embodiments described herein, the system may contain at least one pressure filter, suction filter, or return filter somewhere in the system used to clean/condition/filter the fluid. These filters can be located anywhere within the system including but not limited to the suction line, the pressure line, the return line, an auxiliary line or a case drain line.

Further still, one of skill in the art would recognize upon this disclosure that in any one of the embodiments described herein, the system may contain at least on pressure dampener/silencer/suppressor used to condition/smooth/quite the hydraulic fluid. These elements may be placed anywhere within the system including but not limited to the suction line, the pressure line, the return line, an auxiliary line or a case drain line.

Further still, one of skill in the art would recognize upon this disclosure that in any one of the embodiments described herein, the system may contain at least on pressure dampener/silencer/suppressor used to condition/smooth/quite the hydraulic fluid. These elements may be placed anywhere within the system including but not limited to the suction line, the pressure line, the return line, an auxiliary line or a case drain line.

Further still, one of skill in the art would recognize upon this disclosure that in any one of the embodiments described herein, the system may contain at least on pressure dampener/silencer/suppressor used to condition/smooth/quite the hydraulic fluid. These elements may be placed anywhere within the system including but not limited to the suction line, the pressure line, the return line, an auxiliary line or a case drain line.

Still further, one of skill in the art would recognize upon this disclosure that in any one of the embodiments described herein, the system may contain at least one or more additional valves in addition to the one previously described to facilitate hydraulic power unit controls. These valve may be placed anywhere within the system including but not limited to the suction line, the pressure line, the return line, an auxiliary line or a case drain line.

Still further, one of skill in the art would recognize upon this disclosure that in any one of the embodiments described herein, the system may contain at least one hydraulic oil cooler/heater somewhere in the system used to condition the fluid. These elements can be located anywhere within the system including but not limited to the suction line, the pressure line, the return line, an auxiliary line, a case drain line, or a reservoir.

Still further, one of skill in the art would recognize upon this disclosure that in any one of the embodiments described herein, the system may contain at least one or more additional sensors in addition to the one previously described to facilitate hydraulic power unit controls. These sensors may be placed anywhere within the system including but not limited to the suction line, the pressure line, the return line, an auxiliary line, a case drain line, or a reservoir.

Still further, one of skill in the art would recognize upon this disclosure that in any one of the embodiments described herein, the system may contain at least one or more additional pumps in addition to the one previously described to facilitate hydraulic power unit controls. These pumps may be placed anywhere within the system including but not limited to the suction line, the pressure line, the return line, an auxiliary line, a case drain line, or a reservoir.

Finally, one of skill in the art would recognize upon this disclosure that in any one of the embodiments described herein, the system may contain at least one or more additional accumulators in addition to the one previously described to facilitate hydraulic power unit controls. These accumulators may be placed anywhere within the system including but not limited to the suction line, the pressure line, the return line, an auxiliary line, or a case drain line.

While preferred embodiments of the present invention have been shown and described herein, it will be obvious to those skilled in the art that such embodiments are provided by way of example only. Numerous variations, changes, and substitutions will now occur to those skilled in the art without departing from the invention, in accordance with the claims. It should be understood that various alternatives to the embodiments of the invention described herein may be employed in practicing the invention.

What is claimed is:

1. A hydraulic charging system comprising:

at least one power source;

at least one electric motor;

at least one current sensor;

at least one variable displacement hydraulic (VDH) pump;

at least one pressure control valve;

at least one hydraulic fluid accumulator;

a pressure sensor; and a closed loop logic controller comprising multiple control algorithms;

wherein the at least one power source provides power to the at least one electric motor, the at least one electric motor drives at least one VDH pump, the at least one current sensor monitors a load draw of the at least one electric motor during operation, and the at least one VDH Pump;

pressurizes a hydraulic fluid until it reaches a setpoint of the at least one pressure control valve, and charges the at least one hydraulic accumulator;

wherein a system hydraulic fluid pressure is monitored by the pressure sensor, wherein the at least one current sensor and the pressure sensor provide feedback readings to the closed loop logic controller, and wherein the closed loop logic controller processes load readings from the at least one current sensor and pressure readings from the pressure sensor using the multiple control algorithms to generate commands to the at least one pressure control valve to maintain a constant desired load condition of the at least one VDH pump and therefore the load of the at least one electric motor.

2. The hydraulic charging system of claim 1, further comprising a downstream pressure reducing valve downstream from the pressure control valve to hold a downstream system pressure fixed irrespective of the pressure measured at the pressure control valves.

3. The hydraulic charging system of claim 1, wherein the system is adapted to hydraulic systems powered by generator power sources.

4. The hydraulic charging system of claim 1, wherein the system is adapted to marine hydraulic systems.

5. The hydraulic charging system of claim 1, wherein the system is adapted to:

construction equipment power systems;

emergency power back-up systems;

aviation systems; or any system that requires a constant load draw from an available power source;

wherein a hydraulic system fluctuates, causing the power source to act in a negative manor, comprising voltage drops, frequency drops or current spikes.

6. The hydraulic charging system of claim 1, wherein the at least one electric motor is turned on by a power source start device comprising:

a variable frequency drive (VFD);

a one speed drive (OSD); or a Delta-Wye starter.

7. The hydraulic charging system of claim 1, wherein the at least one electronic pressure control valve comprises:

a pressure relief valve;

a pressure reducing/relieving valve; or a flow control valve.

8. The hydraulic charging system of claim 1, wherein an average load condition measured by the at least one current sensor slowly changes over time when measured at known intervals.

9. The hydraulic charging system of claim 1, wherein an instantaneous load condition measured by the at least one current sensor is maintained constant by a power control loop of the control algorithm.

10. The hydraulic charging system of claim 1, wherein the at least one VDH pump imposes loads on the at least one electric motor such that based on a flow and pressure output, one can increase or decrease the load by adjusting the pressure of the control valve which is controlled by a pressure control loop of the control algorithm.

11. The hydraulic charging system of claim 10, wherein a load condition is maintained by increasing a pressure setting controlled by a control algorithm of the pressure control loop for the pressure control valve when the system demand is reduced or decreasing.

12. The hydraulic charging system of claim 10, wherein a load condition is maintained by decreasing a pressure setting of the electronic pressure control valve when a system demand is increased or raised using the pressure control loop of a control algorithm.

13. The hydraulic charging system of claim 12, wherein downstream increases in a system flow cause hydraulic fluid to be released from the hydraulic accumulator into the system.

14. The hydraulic charging system of claim 13, wherein an average pressure changes cause a first control loop in the logic controller to compare target pressures versus current pressure and is directed to maintain an average pressure value.

15. The hydraulic charging system of claim 14, wherein a load control loop of a control algorithm of the logic controller issues a command to the at least one electronic pressure control valve to reduce pressure in order to maintain a constant average pressure load as measured at the at least one current sensor.

16. The hydraulic charging system of claim 15, wherein the system will continue to function normally as long as a minimum pressure sensed by an electronic pressure sensor remains greater than a desired system pressure downstream.

17. The hydraulic charging system of claim 1, wherein an output load of the pump is capable of being limited by up to 100% by lowering a system pressure.

18. The hydraulic charging system of claim 17, wherein power or torque limiting of the pump is controlled to prevent the at least one motor from drawing more current than the at least one motor is rated for.

19. The hydraulic charging system of claim 17, wherein power of the at least one electric motor is controlled by an algorithm in a sequential control loop of the closed loop logic controller.

20. A hydraulic charging system comprising:

two or more power sources;

two or more electric motors;

two or more current sensors;

two or more variable displacement hydraulic (VDH) pump;

two or more pressure control valves;

at least one hydraulic fluid accumulator;

a pressure sensor; and a closed loop logic controller comprising multiple control algorithms to balance a loading of two or more electric motors;

wherein the two or more power sources provide power to the two or more electric motors, wherein the two or more electric motors drive the two or more VDH pumps, the two or more current sensors monitor the load draw of the two or more motors during operation, and the two or more VDH Pumps;

pressurize a hydraulic fluid until it reaches a setpoint of each of the two or more pressure control valves, and charges the at least one hydraulic accumulator;

wherein a system hydraulic fluid pressure is monitored by the pressure sensor, wherein the two or more current sensors and the pressure sensor provide feedback readings to the closed loop logic controller, and wherein the multiple control algorithms of the closed loop logic controller processes readings from the two or more current sensor and the reading from the pressure sensor to generate commands to the two or more pressure control valves to maintain desired constant loading conditions of the two or more VDH pumps and constant loading conditions the two or more electric motors.

21. The hydraulic charging system of claim 20, further comprising a downstream pressure reducing valve to hold a downstream system pressure fixed irrespective of the pressure measured at the pressure control valves.

22. The hydraulic charging system of claim 20, wherein the system is adapted to hydraulic systems powered by generator power sources.

23. The hydraulic charging system of claim 20, wherein the system is adapted to marine hydraulic systems.

24. The hydraulic charging system of claim 20, wherein the system is adapted to:

construction equipment power systems;

emergency power back-up systems;

aviation systems; or any system that requires a constant load draw from an available power source;

wherein the hydraulic system fluctuates, causing the power source to act in a negative manner, comprising voltage drops, frequency drops or current spikes.

25. A method of reducing cyclic loading in a hydraulic system comprising:

providing at least one electric motor;

providing at least one current sensor;

providing at least one pressure compensated, at least one variable displacement hydraulic (VDH) pump;

providing at least one pressure control valve;

providing at least one hydraulic fluid accumulator;

providing a pressure sensor; and providing a closed loop logic controller comprising multiple control algorithms;

wherein the at least one power source provides power to the at least one electric motor to drive the at least one VDH pump, which charges the hydraulic accumulator and pressurize a hydraulic fluid until it reaches a setpoint of the at least one electronic pressure control valve, wherein the at least one current sensor monitors the load draw of the at least one motor during operation and a system hydraulic fluid pressure is monitored by the pressure sensor, wherein the at least one current sensor and the pressure sensor provide feedback readings to the multiple algorithms of the closed loop logic controller, and the multiple algorithms of the closed loop logic controller process the at least one current sensor reading and the pressure sensor reading in order to generate commands to the at least one pressure control valve to reduce cyclic load spikes in loading conditions of the at least one VDH pump and the at least one electric motor.

26. The method of claim 25, further providing a downstream pressure reducing valve to hold a downstream system pressure fixed irrespective of the pressure measured at the at least one pressure control valve.

27. The method of claim 25, wherein a size or volume of the hydraulic accumulator or an accumulation can be reduced within a range of between about 60% to about 80% without affecting performance of the system.

28. The method of claim 25, wherein sequentially added control algorithms, added to the closed loop logic controller, balance loads of each sequentially added pump and motor combinations within the hydraulic system and equalizes wear on all pump and motors in the system.

* * * * *